United States Patent

Tomassi et al.

[11] Patent Number: 5,939,796
[45] Date of Patent: Aug. 17, 1999

[54] COMBINATION MIRROR AND MEMORY SWITCH

[75] Inventors: Roberto Tomassi, Livonia; Mark Feldman, Farmington Hills; John Cranick, White Lake; Gennaro Fedele, West Bloomfield, all of Mich.

[73] Assignee: UT Automotive Dearborn, Inc., Dearborn, Mich.

[21] Appl. No.: 09/012,844

[22] Filed: Jan. 23, 1998

[51] Int. Cl.⁶ .................................................. G05D 3/00
[52] U.S. Cl. ............................................ 307/10.1; 701/49
[58] Field of Search .................................. 307/9.1, 10.1, 307/113, 125, 115, 119; 701/36, 49; 318/466

[56] References Cited

U.S. PATENT DOCUMENTS

| | | | |
|---|---|---|---|
| 4,682,088 | 7/1987 | Sullivan | 318/466 |
| 4,727,302 | 2/1988 | Mizuta et al. | 318/466 |
| 4,811,226 | 3/1989 | Shinohara | 318/466 |
| 5,019,759 | 5/1991 | Takemura et al. | 307/10.1 |

*Primary Examiner*—Richard T. Elms
*Attorney, Agent, or Firm*—Howard & Howard

[57] ABSTRACT

An electrical switching unit includes a first switch for positioning a vehicle component or activating a memory function. A second switch controls the first switch to select between positioning the component or activating the memory function. Preferably, the switching unit controls the positioning of the right and left side mirrors and activation of a memory function. In one embodiment, the second switch has three positions to select right side mirror positioning, left side mirror positioning, or memory function. The first switch includes four sub-switches to control the upward, downward, inward, and outward adjustment of the right and left side mirror and activation of the set and recall modes of the memory function.

15 Claims, 2 Drawing Sheets

COMBINATION MIRROR AND MEMORY SWITCH

BACKGROUND OF THE INVENTION

This invention relates to an electrical input switch unit for controlling positioning of a vehicle component, and also a memory function.

Modem vehicles contain an increasing large number of electrical input switches, each enabling an occupant to control a specific accessory function. By necessity, these switches are located about the driver's seat in the passenger compartment of the vehicle. As one example, modem vehicle typically include switches for allowing automatic adjustment of the position of both side mirrors from the inside of a vehicle. A first switch component adjusts a second switch between right and left hand mirror positioning modes. Thus, the operator can select either right or left hand mirror positioning from inside the vehicle, and then manipulate a second switch to position the mirrors.

Modem vehicles are often also provided with memory functions. A memory function allows one operator to preset desired positions for components such as the vehicle seats or mirrors, and actuate the memory function upon entering the vehicle to move the seat and mirrors to those preset positions. This allows a vehicle which is utilized by two different individuals to be quickly tailored to the individual operator's desired positions. It has been proposed to combine the mirror positioning switch and the memory switch into a single switch housing. Such a single switch housing would then require at least three distinct switches.

SUMMARY OF THE INVENTION

A main feature of this invention is the incorporation of both the memory and component positioning functions into two switches.

In a disclosed embodiment of the present invention, an electrical switching unit includes a first switch for selectively positioning a vehicle component and activating a memory function. A second switch controls the first switch to select between positioning the vehicle component or activating the memory function.

In one preferred embodiment of the invention, the switching unit controls the positioning of the right and left side mirrors and activation of a memory position for at least the vehicle seats. The second switch is a three position switch used to select right side mirror positioning, left side mirror positioning, or memory operation. The first switch includes four sub-switches to control the upward, downward, inward, and outward adjustment of the right and left side mirror when in a positioning mode. The four push switches activate set and recall memory functions when in memory mode.

The memory function preferably stores at least a preferred setting for the vehicle seats. In other embodiments, the memory function may also store a desired position for the vehicle mirrors in addition to the position of the vehicle seats.

A second embodiment of the first switch is also disclosed. In the second embodiment, rather than a three-position switch, a single switch which may be serially actuated to switch the second switch between the positioning and memory functions is utilized.

The present invention reduces vehicle cost, reduces packaging space in the passenger compartment, and provides flexibility for interior styling. These and other features of this invention will be best understood from the following specification and drawings, the following of which is a brief description.

DETAILED DESCRIPTION OF A PREFERRED EMBODIMENT

Figure 1A:
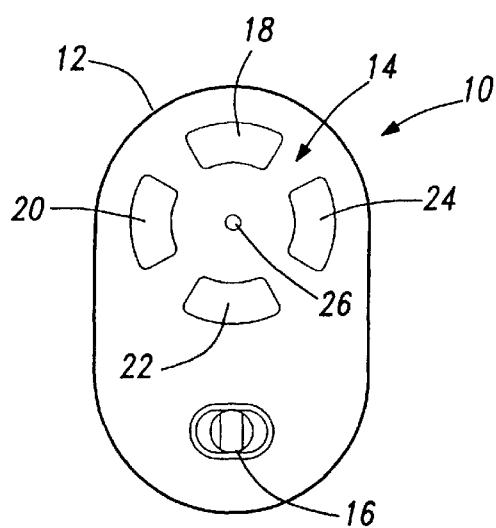
FIG. 1A is a front view of a first embodiment switching unit.
Figure 1B:
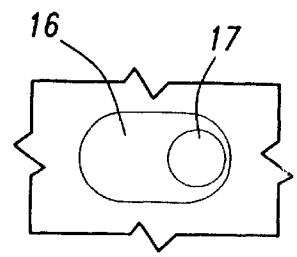
FIG. 1B shows the first switch in a right mirror position.
Figure 1C:
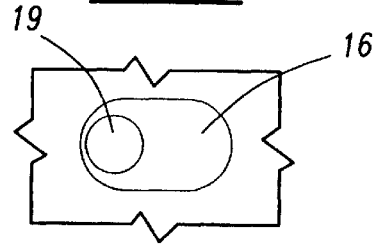
FIG. 1C shows the first switch in a left mirror position.

FIG. 1A shows a front view of a switching unit 10, according to the present invention. In a preferred embodiment, the layout design of the switching unit 10 appears similar to known side mirror adjustment switches. However, the operation is distinct. Switching unit 10 includes a switch body 12 mounting a first switch, generally indicated at 14, and a second switch 16. The second switch 16 controls the first switch 14 to select between a vehicle component positioning mode and a memory mode. In the disclosed embodiment, the second switch 16 may select between side mirror adjustment and activation of a memory function for at least the vehicle seat. Also, the memory mode could include stored desired positions for other components including the side mirror positions. In a preferred embodiment, the second switch 16 is a three position switch. With respect to the foregoing example, the second switch 16 may be designed to control the first switch 14 for adjustment of the right side mirror when the switch 16 is in the farthest right position 17 (FIG. 1B), adjustment of the left side mirror when the switch 16 is in the farthest left position 19 (FIG. 1C) and activation of the memory seat function when the switch 16 is in the middle position (FIG. 1A).

Based upon the position of second switch 16, activation of the first switch 14 either positions a vehicle component or actives a memory function. In a preferred embodiment, first switch 14 includes four sub-switches 18, 20, 22, and 24. If the second switch 16 is in a mirror adjustment position 17, 19, then sub-switch 18 controls upward movement of the selected side mirror, sub-switch 20 controls the left movement of the mirror, sub-switch 22 controls the downward movement of the mirror, and sub-switch 24 controls the right movement of the mirror.

If the second switch 16 is in the memory position, then sub-switch 18 controls the setting of a new memory seat position, sub-switch 20 controls the recall of a first memory seat position, and sub-switch 24 controls the recall of a second memory seat position. One skilled in the art will appreciate that the memory seat operation may be designed to recall a third memory seat position when sub-switch 22 is activated or when sub-switches 20 and 24 are activated simultaneously. Switching unit 10 further includes a LED (light emitting diode) 26 used as a visual indication that the memory set mode has been activated.

Thus, an operator wishing to select a preset memory function moves the first switch 16 to a centered position shown in FIG. 1A. The operator may then select one of the sub-switches to pick between any one of several previously stored desired positions for vehicle components. Preferably, the vehicle components which are stored in the memory include at least a desired position for the vehicle seat. Also, desired vehicle mirror positions may also be stored.

If the operator wishes to set a memory function, one of the sub-switches, such as sub-switch 18, may be actuated to put the switch in a memory set mode. Thus, as an example only, the operator may move the switch 16 to the memory position, move the seat to a desired position (through seat movement systems which form no part of this invention), actuate the set button 18 and then actuate either of the memory switches 20 or 24. This would then store the new seat position in the memory for the respective memory position.

The present invention thus provides the first switch 14 with the ability to perform both the memory and component positioning functions. The prior art requires at least three switches to perform these same functions. Typically, more than one switch has been required for known memory systems, and thus more than three switches would typically be required by known systems.

Figure 2:
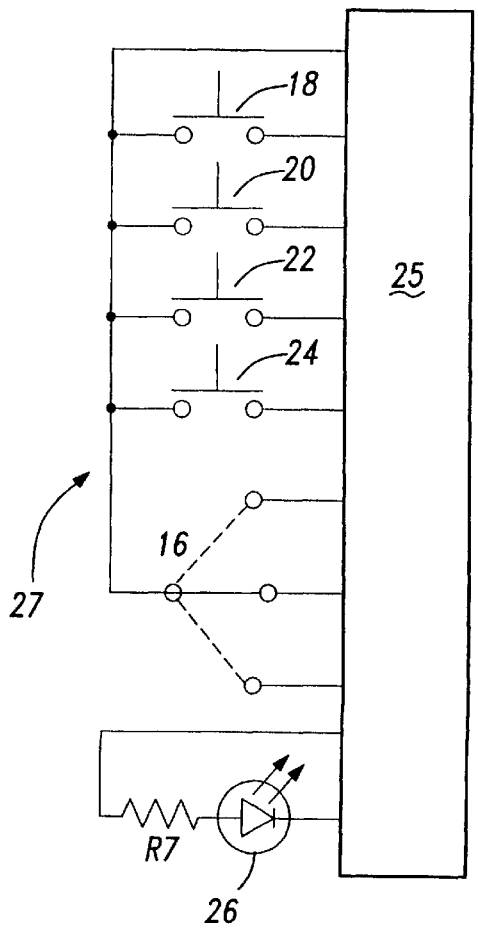
FIG. 2 is an electrical schematic of a first embodiment circuit.

FIG. 2 is an electrical schematic of a circuit 27 for switching unit 10 using a discrete pin design. All four sub-switches 18, 20, 22, and 24 and each of the three positions of second switch 16 provide an independent signal when activated. The signals from each of the pin outputs are captured by a control 25 which can interpret the various combinations and order of signals to determine what command is being generated by the operator.

Figure 3:
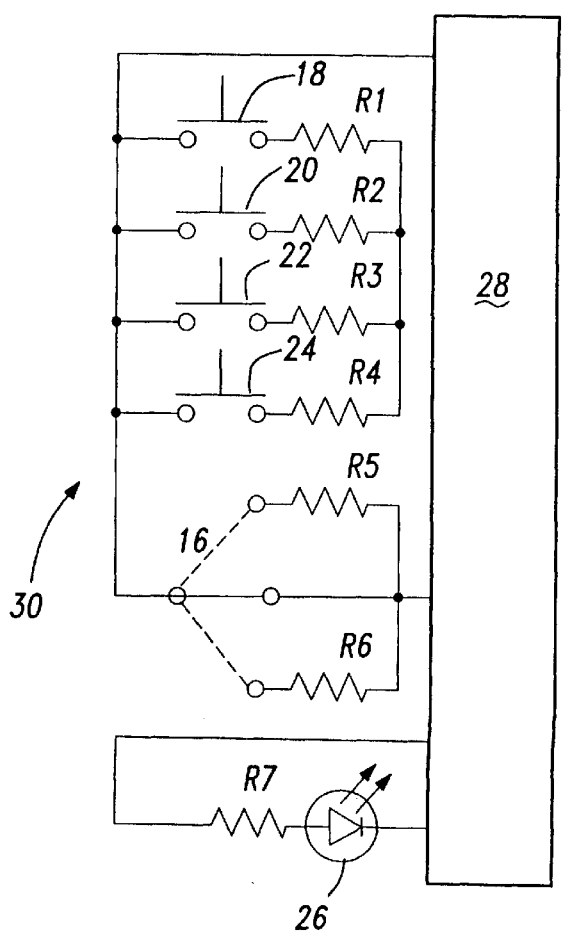
FIG. 3 is an electrical schematic of a second embodiment circuit.

FIG. 3 is an electrical schematic of circuit 30 for switching unit 10 using a resistive ladder design. The resistive ladder design provides a single unique signal upon activation of any valid switch combination. To provide a unique signal, the resistance of resistors R1–R6 are selected to provide a unique total resistive value for each valid combination of switches 18, 20, 22, or 24 and second switch 16. Control 28 is capable of interpreting the various resistances to determine what signal is being sent by the operator. The use of this type of resistance variation to achieve a control over a single signal line is known. It is the use of the two switches to achieve both functions which is the inventive portion of this aspect of the invention.

Figure 4:
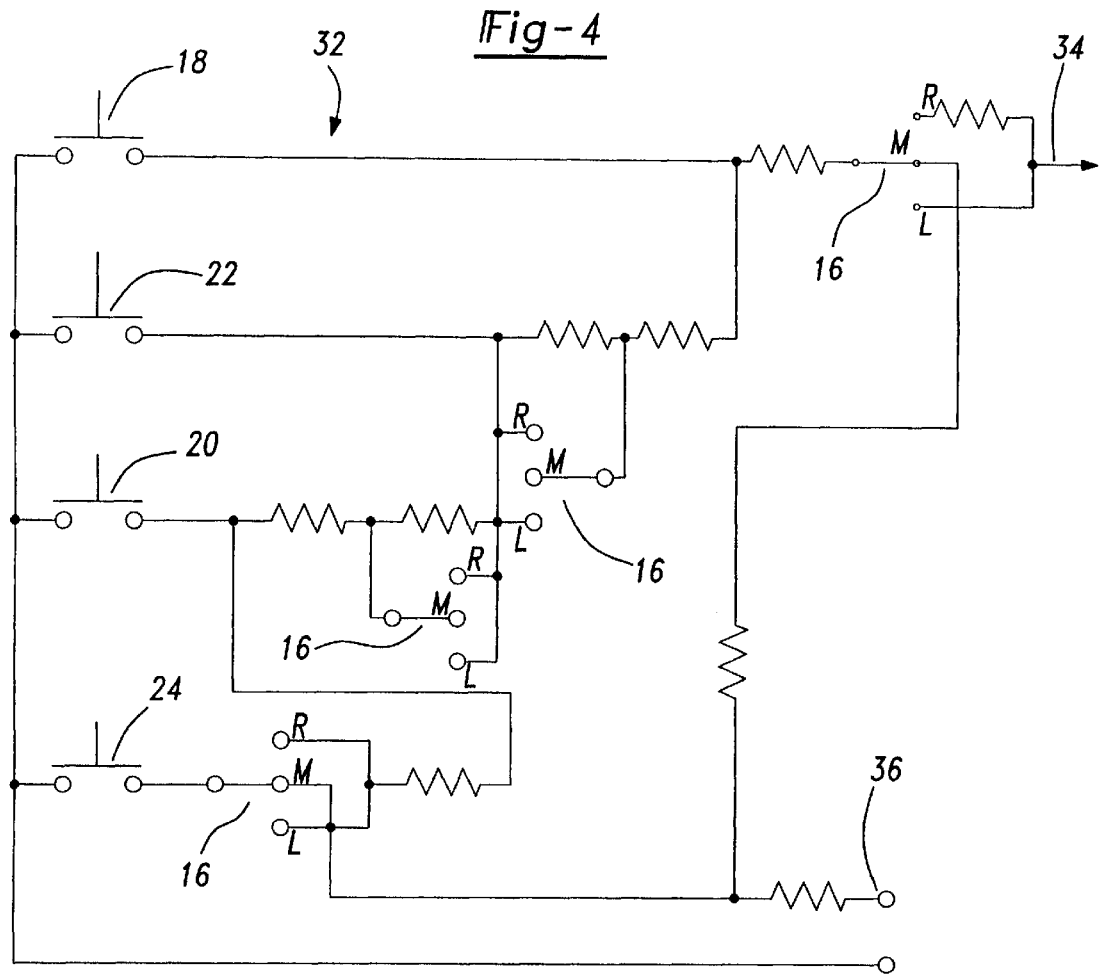
FIG. 4 is an electrical schematic of a third embodiment circuit.

FIG. 4 shows a third control circuit 32, with two distinct outputs 34 and 36 being sent to the control 28. The resistive ladder concept is again utilized, however, the control will also be able to distinguish some information with regard to what signal is being sent by whether the signal travels over the line 34 (mirror positioning signals) or line 36 (a memory signal).

Figure 5:
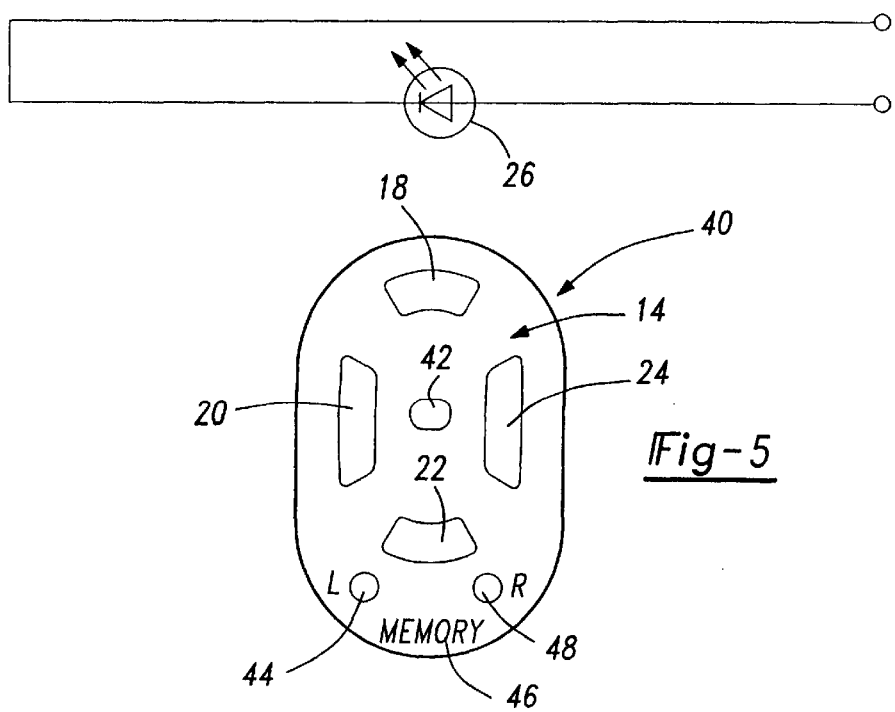
FIG. 5 shows a second embodiment switch unit.

FIG. 5 shows a second embodiment switch housing 40 wherein first switch 14 is again provided by four sub-switches. However, the second switch 42 may be serially actuated to move the first switch between the left hand positioning, right hand positioning and memory functions. LEDs 44 and 48 are actuated when the first switch has been moved by the second switch 42 to the left hand or right hand positions, respectively. In this embodiment, the single select switch 42 replaces the three position switch of the first embodiment. Any one of the three types of circuits shown in FIGS. 2–4 may be utilized with this embodiment switch.

In general, the present invention provides a switching unit for selecting and controlling multiple functions with one set of switches. As such, one skilled in the art will recognize that the assignment of a specific control operation to a specific switch, such as the assignment of upward mirror positioning to sub-switch 18, is not critical.

Although a preferred embodiment of this invention has been disclosed, a worker of ordinary skill in the art would recognize that certain modifications would come within the scope of this invention. For that reason, the following claims should be studied to determine the true scope and content of this invention.

What is claimed is:

1. A switching unit for use in a vehicle comprising:
 a first switch for selectively providing positioning of a vehicle component and activation of a memory function; and
 a second switch operable to control said first switch to select between said positioning of the vehicle component and said activation of the memory function.

2. The switching unit of claim 1 wherein said second switch is a three position switch.

3. The switching unit of claim 2 wherein said three position switch is used to select adjustment of a right side mirror, adjustment of a left side mirror, or activation of a memory function and the vehicle component includes the right and left side mirrors.

4. The switching unit of claim 3 wherein said first switch includes a plurality of sub-switches.

5. The switching unit of claim 4 wherein said plurality of sub-switches control upward, downward, inward, and outward mirror adjustment when said second switch controls said first switch to provide adjustment of the right or left side mirror.

6. The switching unit of claim 5 wherein said plurality of sub-switches recall a first memory position, a second memory position, and allow setting of a new memory position when said second switch controls said first switch to provide activation of said memory function.

7. The switching unit of claim 6 wherein said plurality of sub-switches recall a third memory position.

8. The switching unit of claim 1, wherein said second switch is a single switch which may be serially actuated to move the first switch between said positioning and memory functions.

9. A switching unit for use in a vehicle comprising:
 a first switch for selectively providing positioning of a first vehicle component and activation of a memory function of at least a second vehicle component; and
 a second switch operable to control said first switch to select between said positioning of the first vehicle component and said activation of said memory function.

10. The switching unit as recited in claim 9, wherein said first vehicle component includes the vehicle side mirrors, and said second vehicle component includes at least the vehicle seats.

11. The switching unit as recited in claim 10, wherein said second vehicle components also include the vehicle side mirrors.

12. The switching unit as recited in claim 9, wherein said second switch includes a three position switch.

13. The switching unit as recited in claim 9, wherein said second switch includes a single switch which may be serially actuated to control said first switch and move said first switch between its vehicle positioning and memory modes.

14. A combined mirror adjustment and memory switch unit for a vehicle comprising:

a three way selector switch having a right mirror select position, a left mirror select position, and a memory select position; and four sub-switches for controlling upward, downward, inward, and outward mirror adjustment when said selector switch is in one of said right mirror select position and said left mirror select position and for recalling a first component position, recalling a second component position, and setting a new component position when said selector switch is in said memory select position.

15. The mirror adjustment switch unit of claim 14 wherein said recalling of said first and second component positions includes the recalling of memory locations for at least a seat.

* * * * *